(12) United States Patent
Iuliano

(10) Patent No.: US 7,559,650 B2
(45) Date of Patent: Jul. 14, 2009

(54) MANUFACTURING TECHNIQUES FOR THE PRODUCTION OF HYDRODYNAMIC MULTIFOCAL CONTACT LENSES

(75) Inventor: Michael J. Iuliano, Point Pleasant Beach, NJ (US)

(73) Assignee: In Technology Holdings LLC, Toms River, NJ (US)

( * ) Notice: Subject to any disclaimer, the term of this patent is extended or adjusted under 35 U.S.C. 154(b) by 119 days.

(21) Appl. No.: 11/689,595

(22) Filed: Mar. 22, 2007

(65) Prior Publication Data

US 2008/0231801 A1 Sep. 25, 2008

(51) Int. Cl.
*G02C 7/02* (2006.01)
*B29D 11/00* (2006.01)

(52) U.S. Cl. ........................ 351/177; 264/1.36
(58) Field of Classification Search .................. 359/665; 351/160 R, 160 H, 177, 161; 264/1.36
See application file for complete search history.

(56) References Cited

U.S. PATENT DOCUMENTS

| 3,973,838 | A | | 8/1976 | Page | |
|---|---|---|---|---|---|
| 4,174,156 | A | * | 11/1979 | Glorieux | 351/168 |
| 4,477,158 | A | * | 10/1984 | Pollock et al. | 351/169 |
| 5,229,885 | A | * | 7/1993 | Quaglia | 359/665 |
| 5,610,204 | A | * | 3/1997 | Lai | 522/44 |
| 5,702,441 | A | * | 12/1997 | Zhou | 128/898 |
| 6,027,672 | A | * | 2/2000 | Weitzel et al. | 264/1.36 |

* cited by examiner

*Primary Examiner*—Joseph Martinez
*Assistant Examiner*—James R Greece
(74) *Attorney, Agent, or Firm*—Gottlieb, Rackman & Reisman, P.C.

(57) ABSTRACT

Several methods for making a contact lens with a reservoir are disclosed. The reservoir is filled with fluid and is shaped to change dynamically the optical characteristics of the lens. One method includes forming two shells with a depression therebetween, laminating the shells together, with the reservoir being filled with a fluid. Other methods include molding lens shells and laminating them together, or forming the lens with a unitary body using laser printing techniques.

13 Claims, 11 Drawing Sheets

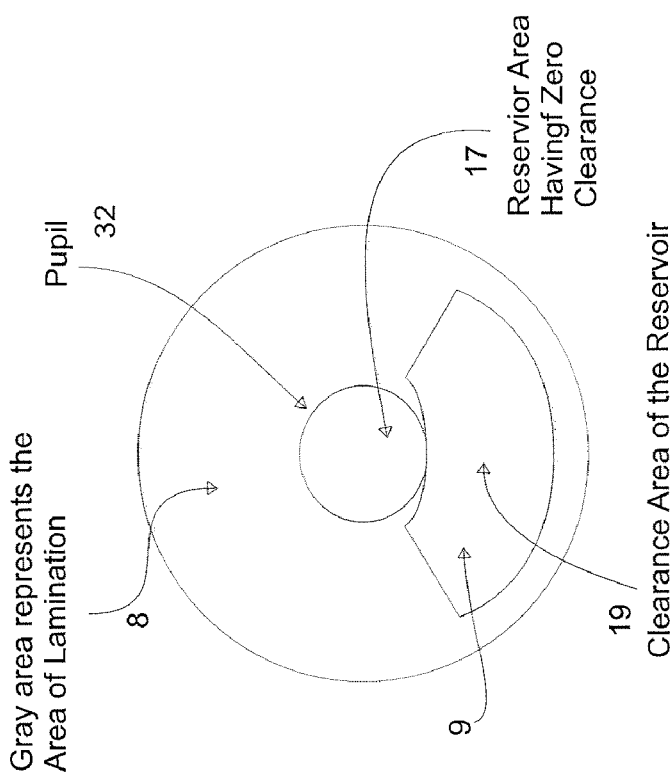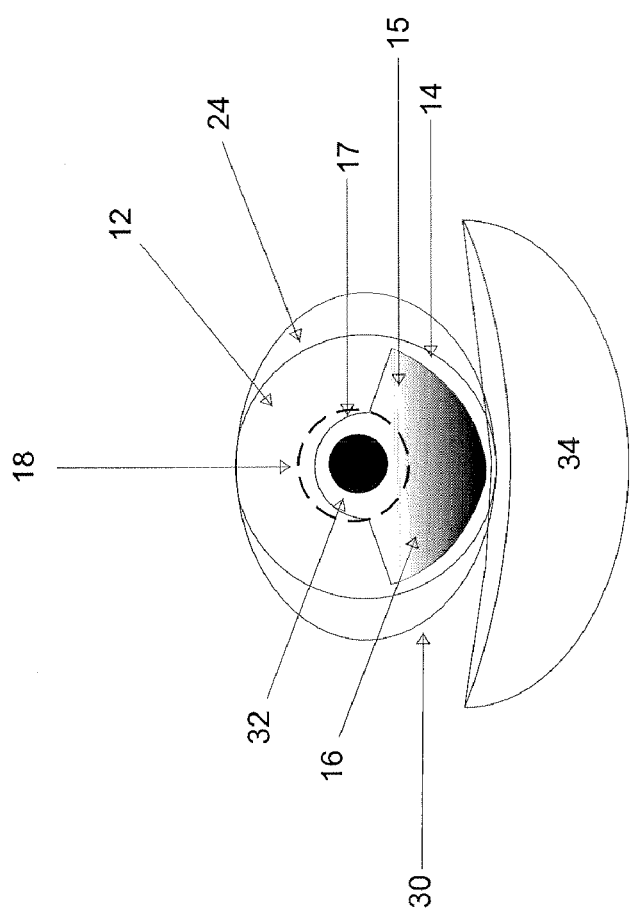

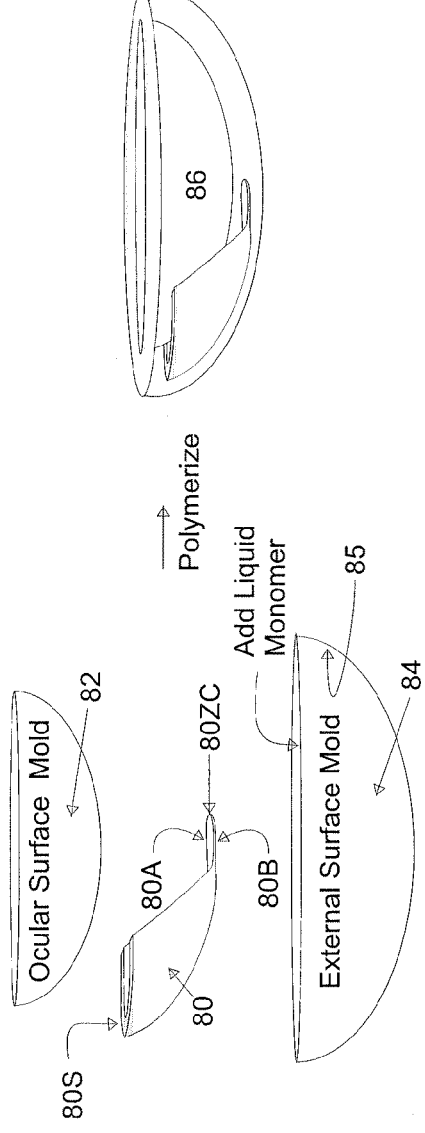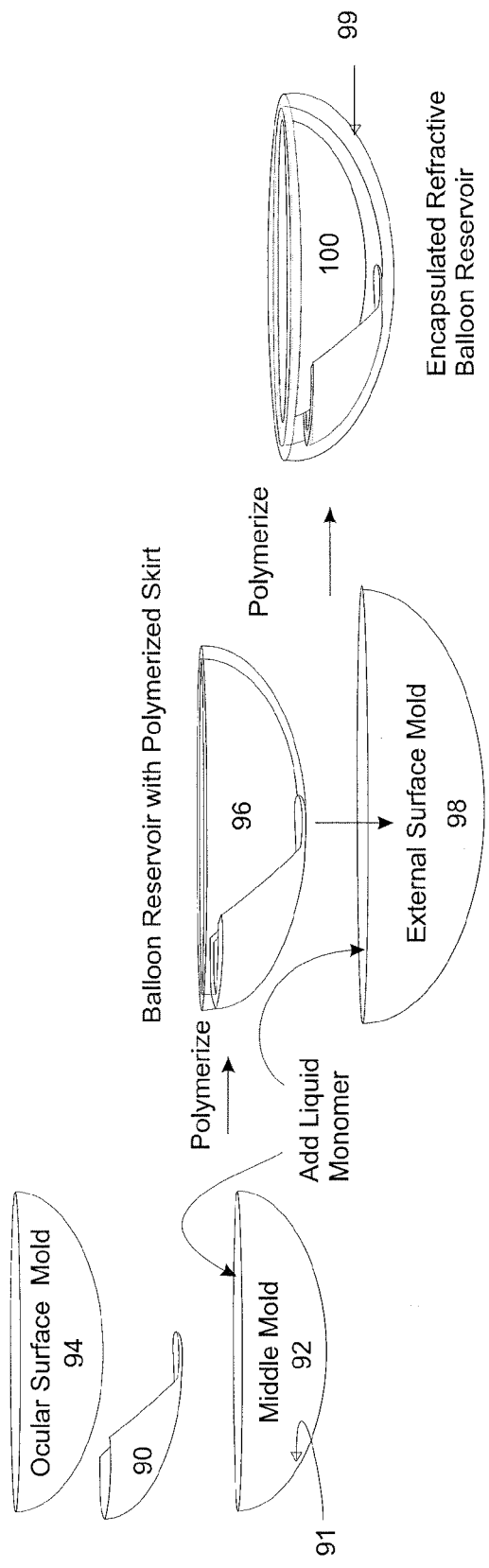
Figure 8
Figure 9

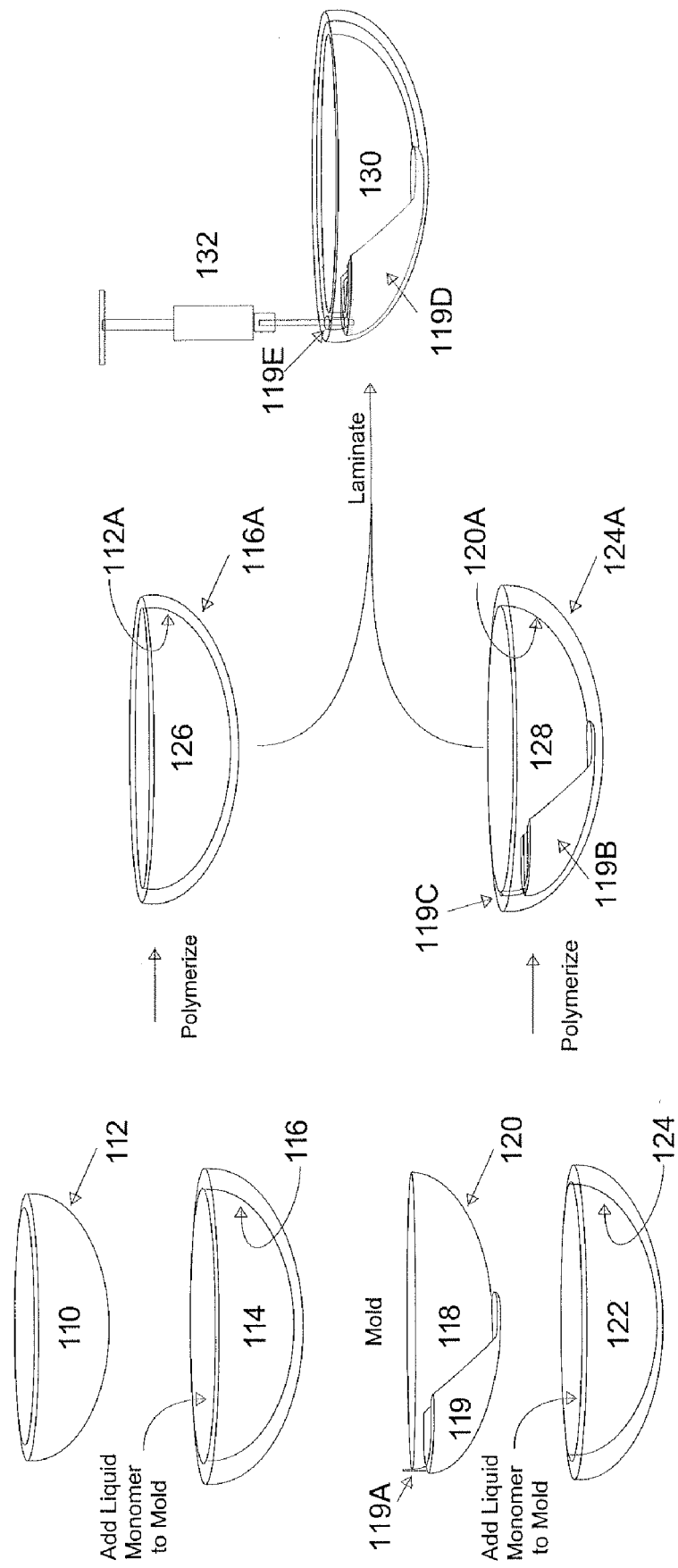

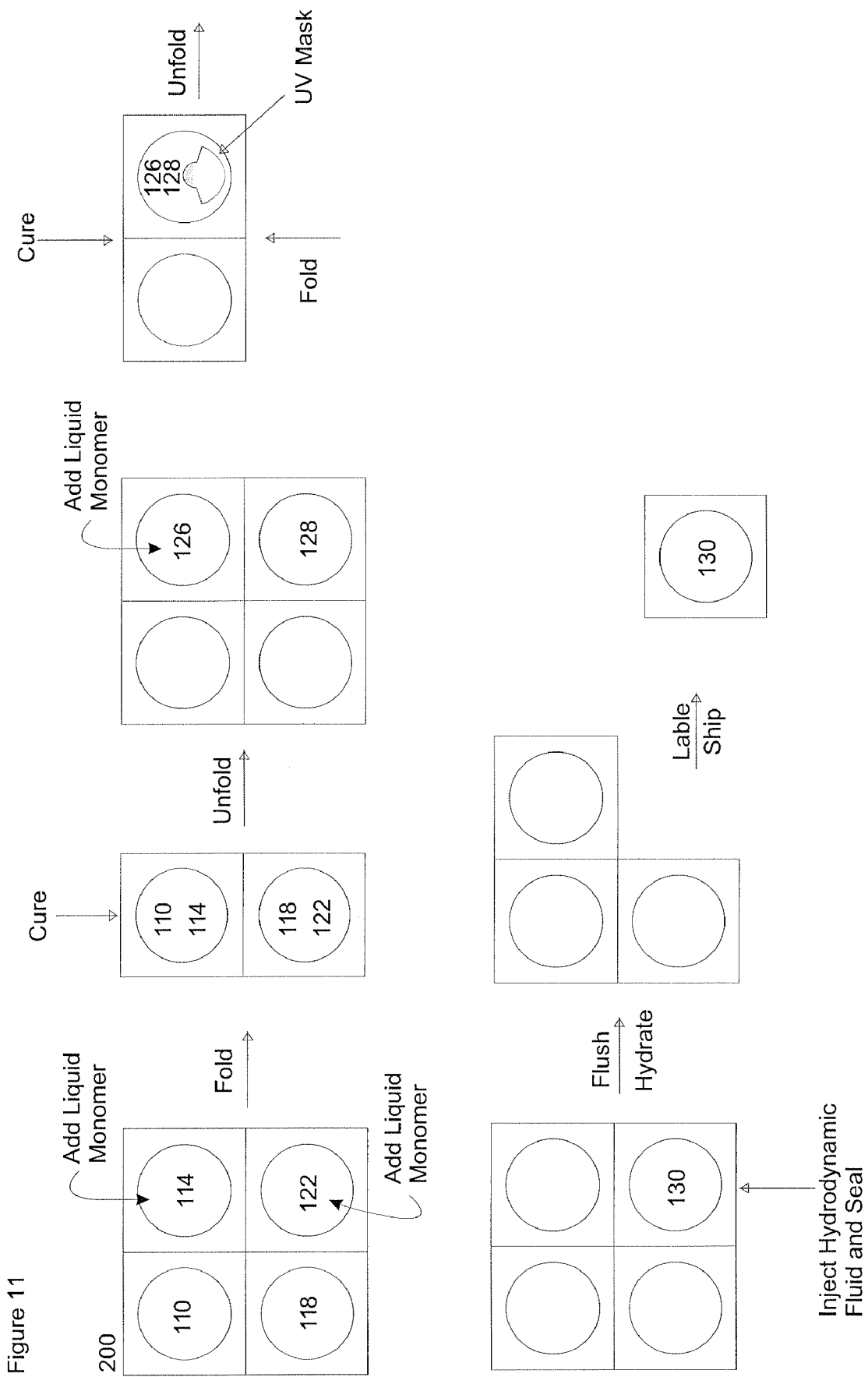

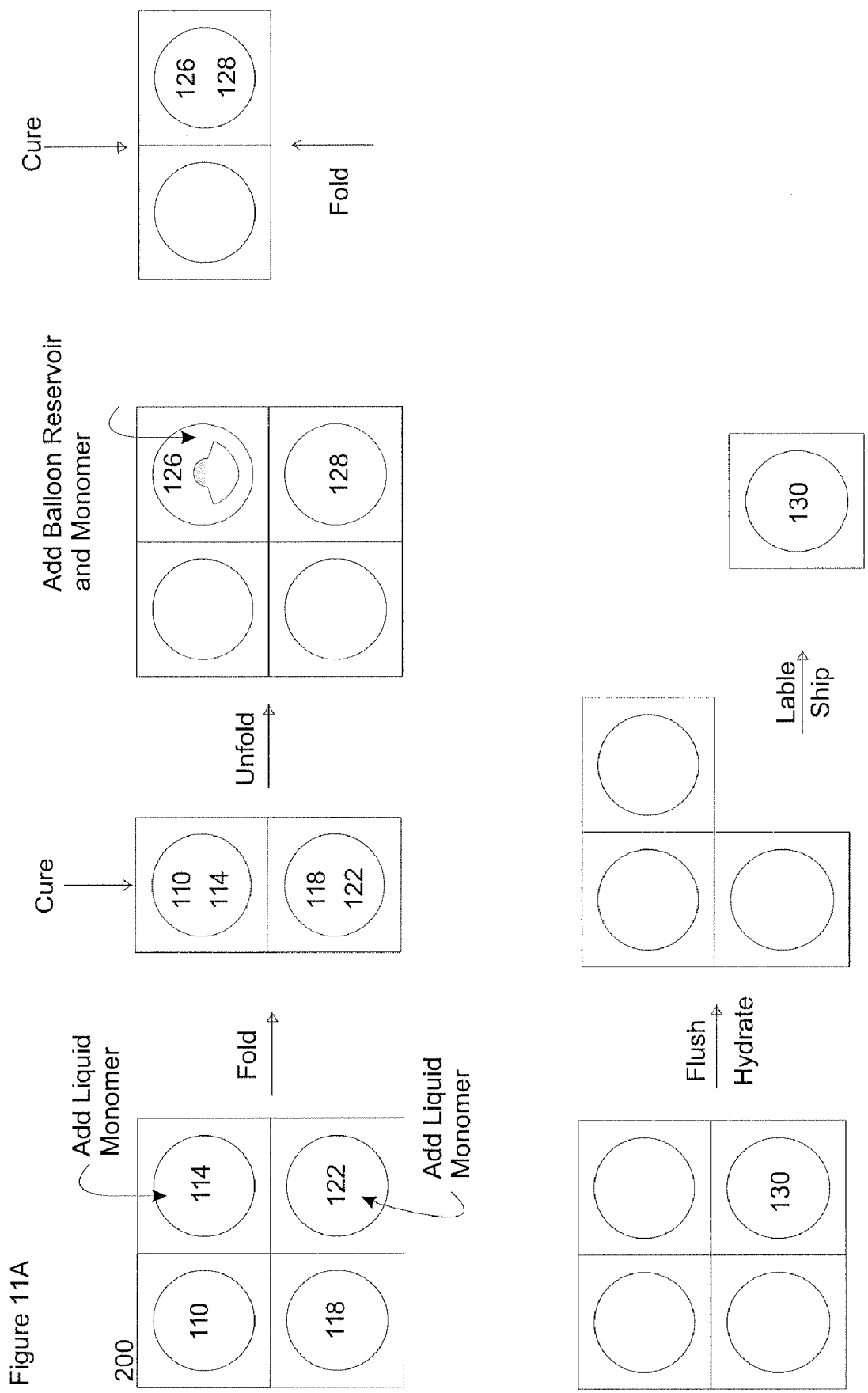

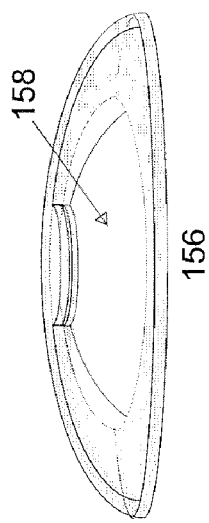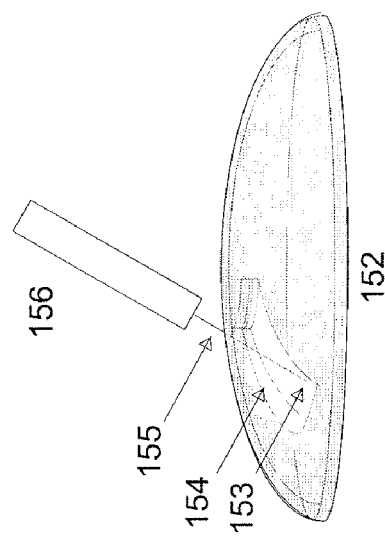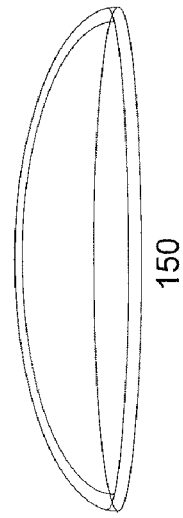
Figure 13

MANUFACTURING TECHNIQUES FOR THE PRODUCTION OF HYDRODYNAMIC MULTIFOCAL CONTACT LENSES

RELATED APPLICATIONS

The subject matter of this application is related to the following applications:

Application Ser. No. 11/326,261 filed Jan. 5, 2006 and entitled Hydrodynamically Operated Multifocal Contact Lens; and Application Ser. No. 11/687,953 filed Mar. 19, 2007 and entitled Improved Hydrodynamically Operated Multifocal Contact Lens, all incorporated herein by reference, now U.S. Pat. No. 11/689,595.

BACKGROUND OF THE INVENTION

1. Field of the Invention

This invention deals with the art of soft contact lens production for the purposes vision correction. More particularly, methods are described for creating a lens capable of dynamically altering the optical power of a soft contact lens, while in the eye, through gaze dependent use of fluid dynamics. The lens thus created may be used for the correction of emmetropia with presbyopia, simple myopia with presbyopia, compound myopic astigmatism with presbyopia, simple hyperopia with presbyopia and compound hyperopic astigmatism with presbyopia or medical conditions like post operative aphakia or pseudophakia, or even accommodative and convergence dysfunctions like accommodative infacility or convergence excess.

2. Description of the Prior Art

Some forty years ago, contact lenses (or contacts) started to be used as a common alternative to glasses to address both distance and near blurred vision. The two types of contact lenses that are presently in use are either PMMA/Rigid Gas Permeable or Hydrophilic Soft contact lenses, with the soft contact design dominating the majority of the retail market by a large margin.

Originally the lenses were produced to remedy only blurred distance vision from either near sighted or far sighted prescriptions. As the field matured more sophisticated designs become available to correct astigmatism (a football shaped eye) in addition to near and far sightedness.

As the age of contact lens wearing population aged the additional need for correcting near vision blur came into play. Generally the way in which contacts have achieved correcting both distance and near vision is either through a translating design or through what is called simultaneous vision designs.

Translating hard contact lenses designs work by having at least two separate optical zones (a bi-focal) in the lens and take advantage of the fact that they move around on the cornea. These lenses are fit such that the lower edge of the contact rests against the lower lid so that as the wearer looks from a distant object, downward to a near object, the lens stays stationary at the lower lid as the eye rotates downward behind the lens so as to be looking through the near vision portion of the contact. This effectively causes the lens to "translate" on the eye.

Simultaneous designs for both hard and soft contacts were developed to address how to focus on distance and near objects when a contact lens is fit to remain essentially in the same location with respect to the optical axis of the eye even during the blink. These lenses currently addressed this issue by creating multiple refractive surfaces disposed directly along the visual axis. Examples of designs used for this purpose include aspheric, diffractive, concentric power rings, and refractive islands. Unfortunately all of these designs focus light coming from different distances onto the retina simultaneously. This is why they are called simultaneous vision designs. As one could imagine these designs result in double or multiple exposures on the retina, which significantly degrade the quality of the retinal image. This is a classic example of attempting to engineer a static solution to a dynamic problem. In other words, the best solution is to create a contact lens, which would mimic the ability of the human eye to dynamically change its focus to whatever it is attending to.

SUMMARY OF THE INVENTION

This present invention discloses various techniques for manufacturing a contact lens capable of exhibiting new physical characteristics useful for dynamically adapting the focus of the eye, and more specifically to a contact lens with a reservoir for a fluid that is shifted dynamically between the periphery and the center of the contact lens. Changes in the refractive characteristics of the contact lens are achieved dynamically via gaze dependent pressures induced by the eyelids on a reservoir of fluid contained inside the contact lens.

In one embodiment, the contact lens is made by the lamination of two halves of a contact lens, also referred to herein as shells. Either one, or both shells are formed with a depression defining a reservoir contour or one has an area of elevation which fits into the other shell's area of depression. Another variation of this lamination embodiment comprises creating a sandwich of three contacts where the center shell has an opening or punch-out in the shape of the intended reservoir while the other two shells seal the opening to form the reservoir. The reservoir is then filled with a fluid having the desired optical characteristics.

Yet another technique provides a balloon pre-filled with the liquid and placed in the depression(s).

Another technique to create an internal reservoir makes use of a laser (e.g., eximer) to etch from the depression(s) from the shell(s).

Another technique involves combining a fine spray of monomer with a fine spray of polymerization agent in the presence of UV light in order to build a contact lens by layered "print polymerization". By controlling the release of polymerization agent it is possible to control where the in the contact lens the monomer solidifies. Using this technique effectively achieves a solid contact lens with a liquid filled reservoir all in one step.

The described techniques can also be used in combination.

BRIEF DESCRIPTION OF THE DRAWINGS

FIG. 1A shows a contact lens disposed in an eye and having a fluid reservoir;

FIG. 1B shows an enlarged plan view of the lens of FIG. 1A;

FIGS. 8-9 show, respectively, a single- and two-step method of encapsulating a preformed balloon reservoir inside a contact;

FIG. 10 show, a method to create an internal reservoir via lamination of wet gel injection molding;

FIG. 11 shows, a production schematic to construct a contact lens containing hydrodynamic reservoir using a four piece mold via lamination of wet gel injection molding;

FIG. 11A shows, a production schematic to construct a contact lens containing hydrodynamic reservoir using a four piece mold to encapsulate a preformed balloon reservoir via lamination of wet gel injection molding;

FIG. 13 shows, a laser etching technique to construct a contact lens containing hydrodynamic reservoir.

DETAILED DESCRIPTION OF THE INVENTION

The present invention discloses various techniques to manufacture a lens capable of exhibiting new physical characteristics useful for dynamically adapting the focus of the eye. FIG. 1A shows a person having an eye 30 with a pupil 32 and a lower lid 34. The upper eye lid has been omitted for the sake of clarity.

Figure 2A:
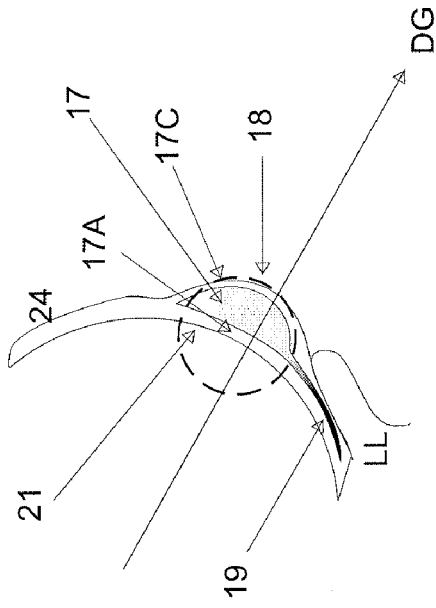
FIGS. 2A and 2B cross-sectional views of the lens of FIGS. 1A, 1B with the user gazing forward and downward, respectively.
Figure 2B:
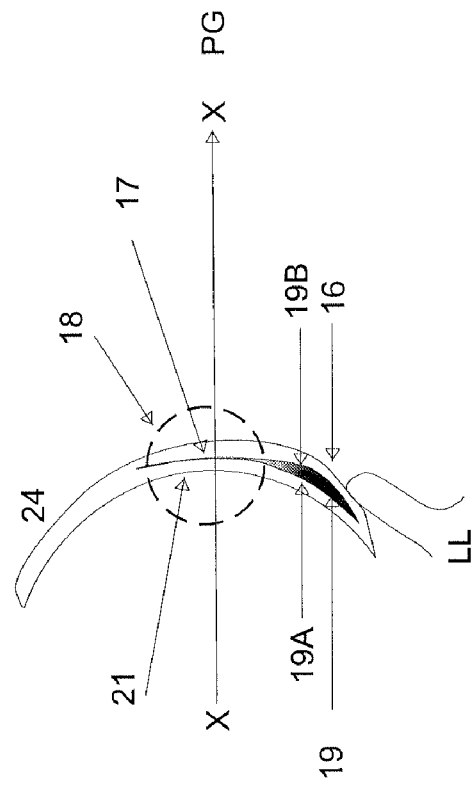
Figure 2C:
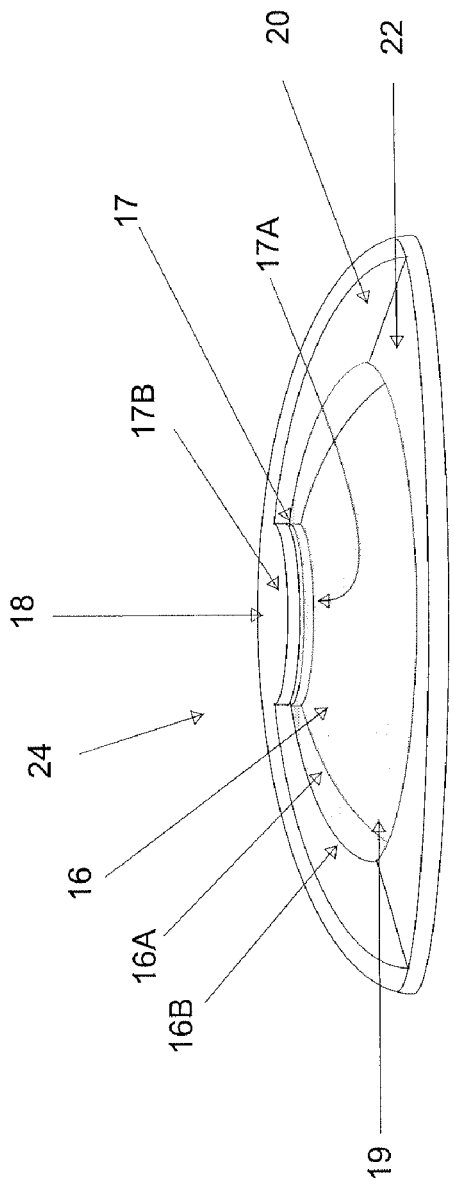
FIG. 2C a side-elevational view of a contact lens constructed in accordance with this invention.

Disposed in the eye 30 there is a contact lens 24 having a standard circular shape. The lens 24 has an upper portion 12 and a lower portion 14. The upper portion 12 is homogeneous and has constant optical characteristics that do not change and are similar to that of a standard contact lens. That is, it may or it may not have any optical characteristics. The lower portion of the lens 14 is formed with a reservoir 16. This reservoir 16 has a shaped somewhat like the letter D facing downward with an upwardly extending circular section or area 17. When the contact 24 is placed into an eye 30, the reservoir 16 extends from the lower portion of the contact lens past the visual axis X-X of the lens 24 (shown in FIG. 2A) and covers the pupil 32. In the position shown in FIG. 2A the lower area 19 of reservoir 16 has a separation or clearance between its internal convex and concave surfaces 19A, 19B while in area 17 the internal convex and concave surfaces 17A, 17B have little or no clearance. The reservoir 16 is filled with non toxic, ocular friendly fluid, such as saline, contact lens lubricants or artificial tears or other non-toxic material such liquid silicone. Preferably, the outer portion 17C of area 17 is distensible as shown in FIG. 2B.

Upon insertion of lens 24 over the eye 30, the weight of the reservoir causes the lens 24 to take the position shown in the Figures, i.e., with the reservoir 16 disposed at the bottom portion of the lens 24. When the wearer gazes straight forward through the lens for distant vision, he is are looking along the optical axis X-X that passes through the central optic zone 18 of the eye 30, which is covered by area 17 of reservoir 16. In this position, the fluid 15 is primarily deposited in the lower area 19 of the reservoir 16 as shown in FIG. 2A. In this configuration, the area 17 portion of the lens 24 has the same effect as the rest of upper portion 12. That is, it may have no optical effect, or it may be shaped to provide distance vision.

In order to change to near vision, the wearer naturally lowers his eye from primary gaze along axis PG (FIG. 2A) to a downward gaze along axis DG. As the wearer moves his eye from the forward to the downward position, the pressure of the lower lid 34 on the contact lens 24 causes the fluid in area 19 of reservoir 16 to rise, thereby filling and expanding reservoir section or area 17, as shown in FIG. 2B. In other words, the lower lid 34, which normally applies pressure directly to the eyeball during downward gaze, now is used to compress the lower section of this reservoir 9 and force the fluid up into the area 17 located over the visual optic zone 18. As a result, portion 17C of area 17 in FIG. 2B is deformed to a steeper base curve causing a shift in the refractive power of the contact lens 24. The term 'steepen' is a term of the art and it relates to a distortion of a lens that causes the lens to become more convex.

Advantageously, the depth of downward gaze, or the angle of axis DG with respect to axis PG controls the amount of fluid that is pressed into section 17 thereby controlling the overall change in curvature of area 17. This curvature in turn increases the refractive power of the contact lens causing it to change to provide near or close-up vision. Importantly, since the movement of the liquid 15 into and out of area 17 is smooth and continuous, the lens 24 is producing a smooth progression of near addition power similar to that of a progressive lens. In essence what this does, for example, is to take a lens used to correct myopia and gradually makes it less minus by increasing its front base curve in the visual axis. (The same is true for a plus lens but instead of decreasing its power the increase of the base curve would increase its refractive power). This in turn creates a gaze-dependent multifocal contact lens via in situ alteration of the base curve.

To return to distant vision focus, the wearer looks up which carries the contact lens up from behind the lower lid 34 releasing the pressure on the lower area 19 and allowing the fluid from area 17 to flow down and return to area 19 of reservoir 16 in the bottom of the lens, away from the optical axis X-X. This action is further assisted by the upper lid which acts as a squeegee, (utilizing the same "force of apposition" during a blink) This re-flattens the distended outer surface base curve of the contact lens 17B, placing surfaces 17A and 17B back in apposition, thereby returning the focus to distance, as shown in FIG. 2A.

Preferably the hydrodynamic fluid used in the lens is physiologically inert and unable to diffuse through the contact lens walls (normally a polymer). Preferably, the fluid should be able to absorb, and/or transmit oxygen to the eye. For example, the fluid may be a medical grade fluorinated silicone oil (e.g., Silicone oil RMN3 mixture as used for an internal retinal tamponade for complicated retinal detachment repair), a fluid such as Flombins or made of porous microspheres that have had fluorinated silicone bonded to their surface. These small spheres are analogous to very small, very slick ball bearings on a string that in aggregate act as a fluid. But unlike a fluid they are so large they are unable to diffuse through the matrix of the contact lens polymer. Of course, the fluid must transparent.

The following sections cover specific manufacturing techniques that produce a contact lens with an encapsulated fluid in a manner that allows the redistribution of fluid from a peripheral storage zone to a central optic zone of a contact lens, and vice versa, in order induce mechanical, physical and optical alterations of the refractive nature of the contact lens as discussed above.

In one embodiment of the invention, a contact lens with a central reservoir as shown in FIGS. 1A, 1B, 2A-2C is created by laminating of two shells. One or both shells are formed with a contour on an internal surface for defining the reservoir 16, while their respective external surfaces are contoured to fit, stabilize and optically correct the patient's distance vision refractive disorder. These halves can be made using various known techniques, including lath cutting, injection molding, laser etching, layered print polymerization, or other similar means.

Figure 3:
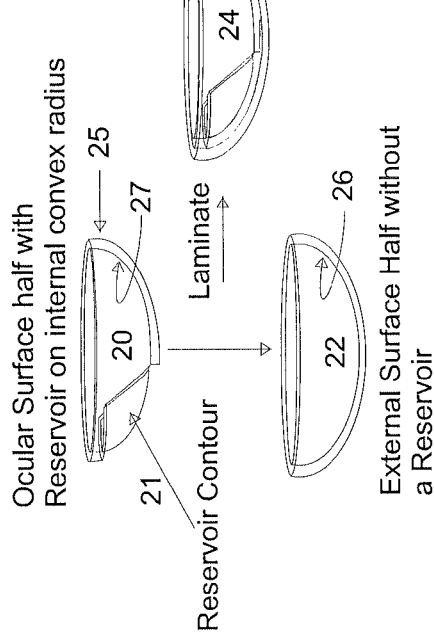

More specifically starting with FIG. 3, a contact lens is made of two shells 20, 22. Contact lens shell 20 is made with a concave surface 27 configured to fit the cornea, and a convex surface 25 configured to mate with the concave surface 26 of contact lens shell 22. A portion of the convex surface 25 is formed with a depression 21 in the shape of one of the walls of the reservoir 9. The surface 26 of shell 22 forms the other wall of the reservoir. In order to form the finished contact lens 24, surfaces 25 and 26 must be aligned and then laminated together. This is accomplished by applying a liquid monomer (preferably the same monomer used to create the shells) to surfaces 25 and 26 and then placing the two surfaces in contact. The thin coating of monomer is then stimulated to polymerizing which then seals the two shells together.

Figure 4:
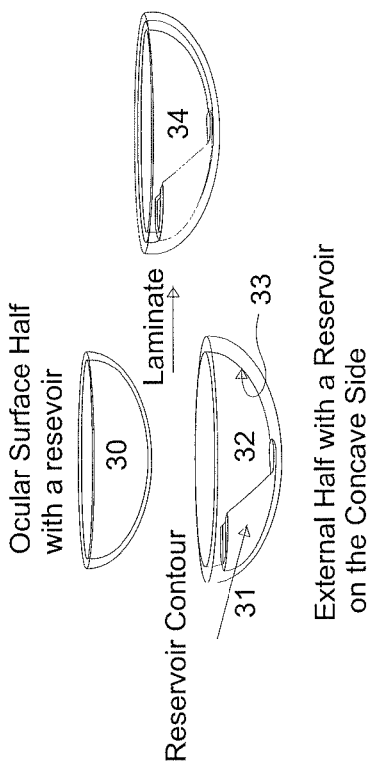
FIGS. 3-5 show various techniques for making a contact lens with a reservoir from shells pre-formed with depression.
Figure 5:
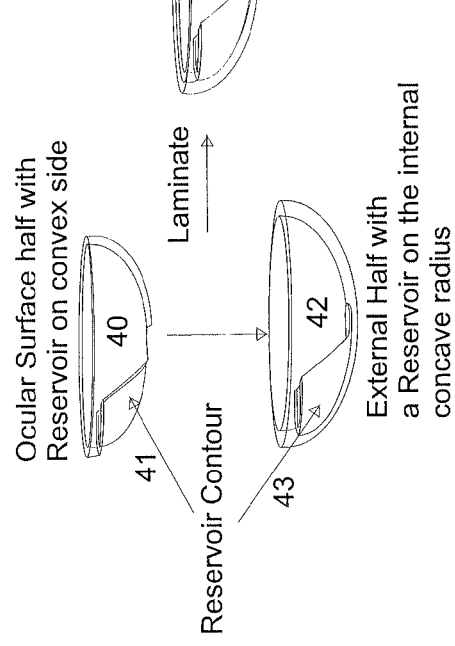

FIGS. 4 and 5 shows a similar process to laminate contacts together to create a central reservoir but depict alternate placements for the reservoir. In FIG. 4 the depression 31 is placed on the concave portion 33 of contact lens shell 32 and the convex side of contact lens shell 30 forms the other wall of the reservoir of lens 34. In FIG. 5 a combination of the techniques of FIGS. 2 and 3 are used. Both shells 40, 42 are formed with respective depressions 41, 43 which then form the reservoir for contact lens 44.

In all these examples the configurations allow the external surface radius or base curves in the optic zone to set the overall distance vision power of the contact lens. This is because the surfaces of both sides of the internal reservoir in central optic zone are in contact with one another and optically do not come in to play. This configuration also creates area 19 peripherally to store the hydrodynamic fluid which when the patient looks from primary gaze (FIG. 2B axis PG) into downward gaze (FIG. 2 axis DG) becomes compressed by the lower lid (LL) causing the fluid to flow up into the "zero clearance" area 17 of the reservoir 16 in the optic zone 18, vaulting the front radius 17B (FIG. 2B) into a steeper base curve causing the lens to become optically more plus thereby aiding focusing for near vision.

Figure 6:
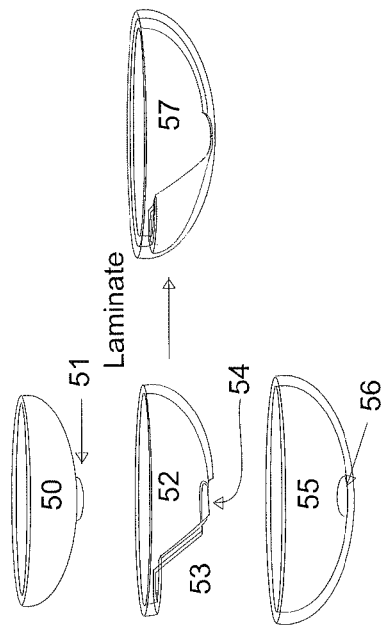
FIG. 6 shows a technique for making a contact lens with a reservoir from three shells.

Another variation of this lamination embodiment is shown in FIG. 6. In this figure a sandwich of three shells 50, 52, 55 is formed. The center shell has cut-out with a peripheral portion 53 and a central portion 54 extending from the peripheral portion 53 to the central region of the shell 52. Peripheral portion 53 has the shape of the area 19 and the central portion 54 has the shape of area 17. The other two shells 50 and 55 form the axial walls of the reservoir. The center portion 54 tapers having thin central region with a thicker peripheral zone. Alternatively, the portion 54 has no taper and central portions of the convex surface of shell 50 and/or the concave surface of shell 55 include bumps to fill the gap centrally between shells 52 and 55 (as at 51 and 56 in FIG. 6) In either case this configuration initially yields a zero clearance centrally between the two outer sealing contacts but also creates space peripherally for the hydrodynamic fluid. Of course, when the user gazes downward, the two walls of the shells separates to allow fluid to enter therebetween, as described above.

Preferably in any of the above designs the walls making up the reservoir would either have a male and female contour that when aligned together would still have some clearance between them to hold the hydrodynamic fluid. This configuration, under pressure applied by the lower lid, will force the male contour into the female contour causing the fluid to flow up in to the area of zero clearance in the optic zone.

Prior to use, and preferably during the manufacturing process, the hydrodynamic fluid must be introduced into the reservoir 16. There are several ways in which this is accomplished. In one embodiment shown in FIG. 7A, a carefully measured quantity of the fluid 62 is inserted into the reservoir portion 66 between shells 64, 66 prior to lamination.

Figure 7B:
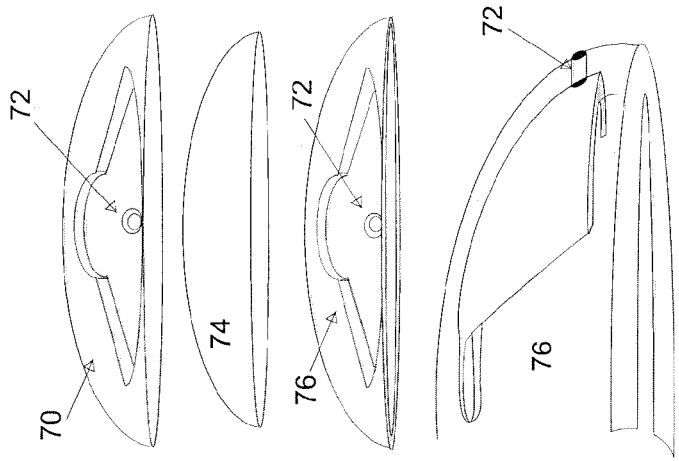
FIGS. 7A-7D show alternate methods filling the internal reservoir with fluid.
Figure 7D:
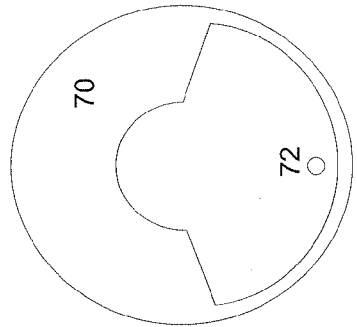
Figure 7A:
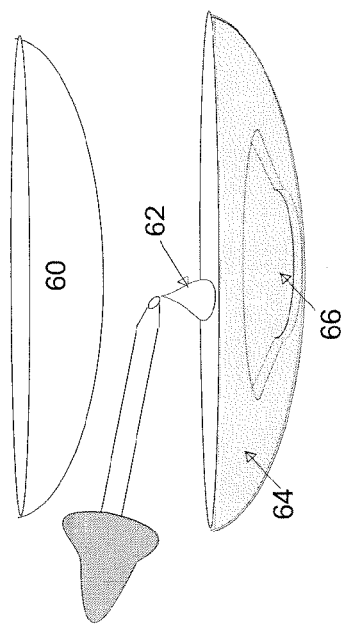
Figure 7C:
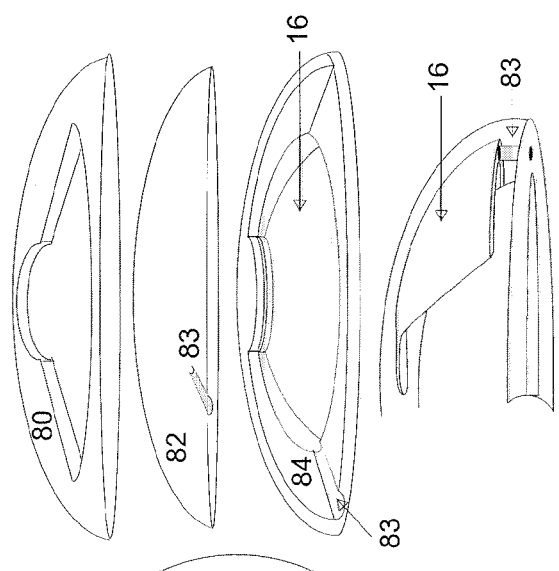

Another embodiment shown in FIG. 7B involves putting a very small hole 72 in the peripheral reservoir portion of one of the shells 70 prior to laminating. In yet another embodiment shown in FIG. 7C a rim channel 83 is created on the convex surface of contact lens shell 82 leading from the rim of the contact lens to the reservoir. Then, after laminating the two shells together, the reservoir is filled through the hole 72 or rim channel 83 with a syringe and microfill tip setup. Next, a drop of raw monomer is introduced into the hole or channel and allowed to polymerize to seal access to the reservoir.

In another embodiment the shells are coated and the reservoir is filled with preferably a non-toxic ocular friendly raw monomer. The monomer is then carefully polymerizes only around the periphery and surface of the shells leaving the reservoir filled with liquid monomer, which would then act as the hydrodynamic fluid.

Once the lens hydrodynamic contact lens complete it is ready to be hydrated.

The hydrodynamic fluid used in the lens should be physiologically inert, and unable to diffuse through the contact lens polymer and able to transmit oxygen. One embodiment of this invention uses a medical grade fluorinated silicone oils (e.g., Silicone oil RMN3 mixture as used for an internal retinal tamponade for complicated retinal detachment repair). Another embodiment uses Flombins or porous microspheres that have had fluorinated silicone bonded to their surface. These small spheres are analogous to very small, very slick ball bearings on a string that in aggregate act as a fluid. But unlike a fluid they are so large they are unable to diffuse through the matrix of the contact lens polymer.

In another embodiment a hydrodynamic reservoir is created through polymerizing a raw monomer around a preformed balloon. This process occurs in a "wet gel" state, which allows the polymer to form in its hydrated equivalent expanded state. This prevents expansion issues that might of occurred between the hydrating polymer matrix and the encapsulated, a non expanding, balloon reservoir.

As seen in FIG. 8 a balloon reservoir 80 is created to follow the contour of the intended finished contact lens. It is made of water-tight material such as a silicone and filled with a hydrodynamic substance such as a fluorinated silicone oil, or saline solution similar to the ones used in breast implants. The balloon reservoir 80 is formed with one portion 80S corresponding to area 19 and a very thin portion 80ZC formed between two reservoir walls 80A, 80B corresponding to area 17. The reservoir 80 is formed with a convex surface having strips of polymer (not shown) that act as spacers or suspension tethers to cause the balloon to sit off the external mold's concave surface 85.

The balloon reservoir 80 is then positioned or suspended by tethers between two molds, an ocular surface 82 contour mold and an external surface mold 84. A raw monomer is then injected and polymerized to form the shells embracing the reservoir 80 to form the finished contact lens 86.

In a variation of the method described above, the suspension of the balloon is eliminated as shown in FIG. 9. An ocular surface shell 96 is created as follows. The pre-filled balloon 90 is placed against the concave surface 91 of internal surface mold 92 and the mold is closed by the ocular surface mold 94. A raw monomer is injected and polymerized in the mold to form the ocular surface 96 with balloon reservoir skirt. This skirt is then transferred to the external mold 98 where the second shell with an external surface 99 is formed through injection mold lamination. The combination of the ocular surface/balloon reservoir skirt 96 and the external surface 99 yields the finished product 100. At this point the contact can be flushed of its expansion solution and hydrated.

Yet another variation of this embodiment is to create two sets of injection mold shells each with some of the surface contours that would make up an internal reservoir as well as external ocular fitting surfaces and optical components as illustrated in figure FIG. 3, 4, 5 or 6. The general concept is depicted in FIG. 10 where the mold 110 containing the ocular surface contour 112 is brought together with the mold 114 containing the smooth central laminating surface contour 116 to create the ocular surface shell 126. Concurrently to this formation the external shell 128, containing, on the concave surface, the reservoir contour 119B, with the contour for the micro filling channel 119C and on the convex external surface contour 124A, is formed by bringing together mold 118, containing the smooth convex middle laminate surface 120 and bump out reservoir contour 119 and the bump out fluid channel contour 119A, with mold 122 containing the external convex surface contour 124. Shells 126 and 128 are then laminated together to yield contact lens 130 containing a reservoir 119D and micro-filling channel 119E. This reservoir is then filled with liquid silicone through microfill yipped syringe setup 132 and sealed by polymerizing a drop of monomer in the access channel.

This manufacturing process is further depicted in FIG. 11 where mold 200 consists of four hinged sub-molds 110, 114, 118, 122. After the monomer is added to molds 110 and 118, mold 200 is folded over along the vertical hinge such that sub-molds 110 and 114 mate, as do 118 and 122. Curing the monomer in each pair yields contact lens shells 126 and 128. After unfolding, monomer is carefully applied onto the convex surface of 126 and the concave surface of 128, making sure to follow the area of lamination as shown in FIG. 1B. Mold 200 in then folded over along the horizontal hinge and a UV mask covering the entire reservoir is put in place. After curing the mold is unfolded and the reservoir is filled with hydrodynamic fluid. Introducing a drop of monomer and curing seals the filling port. Now the completed hydrodynamic multifocal contact 130 can be flushed of its expansion fluid, hydrated, labeled and shipped.

FIG. 11A depicts a similar process except a balloon reservoir is laminated between 126 and 128.

Unlike the technique described above this embodiment intends to describe a technique to partially polymerize raw contact lens monomer into a contact lens complete with a reservoir already filled with hydrodynamic fluid (eg. the remainder of the un-polymerized contact lens monomer) capable of redistribution of fluid or fluid pressure from a peripheral storage zone to a central optic zone for the purposes of mechanical, physical and optical alteration of the refractive nature of the contact lens as described above.

Figure 12:
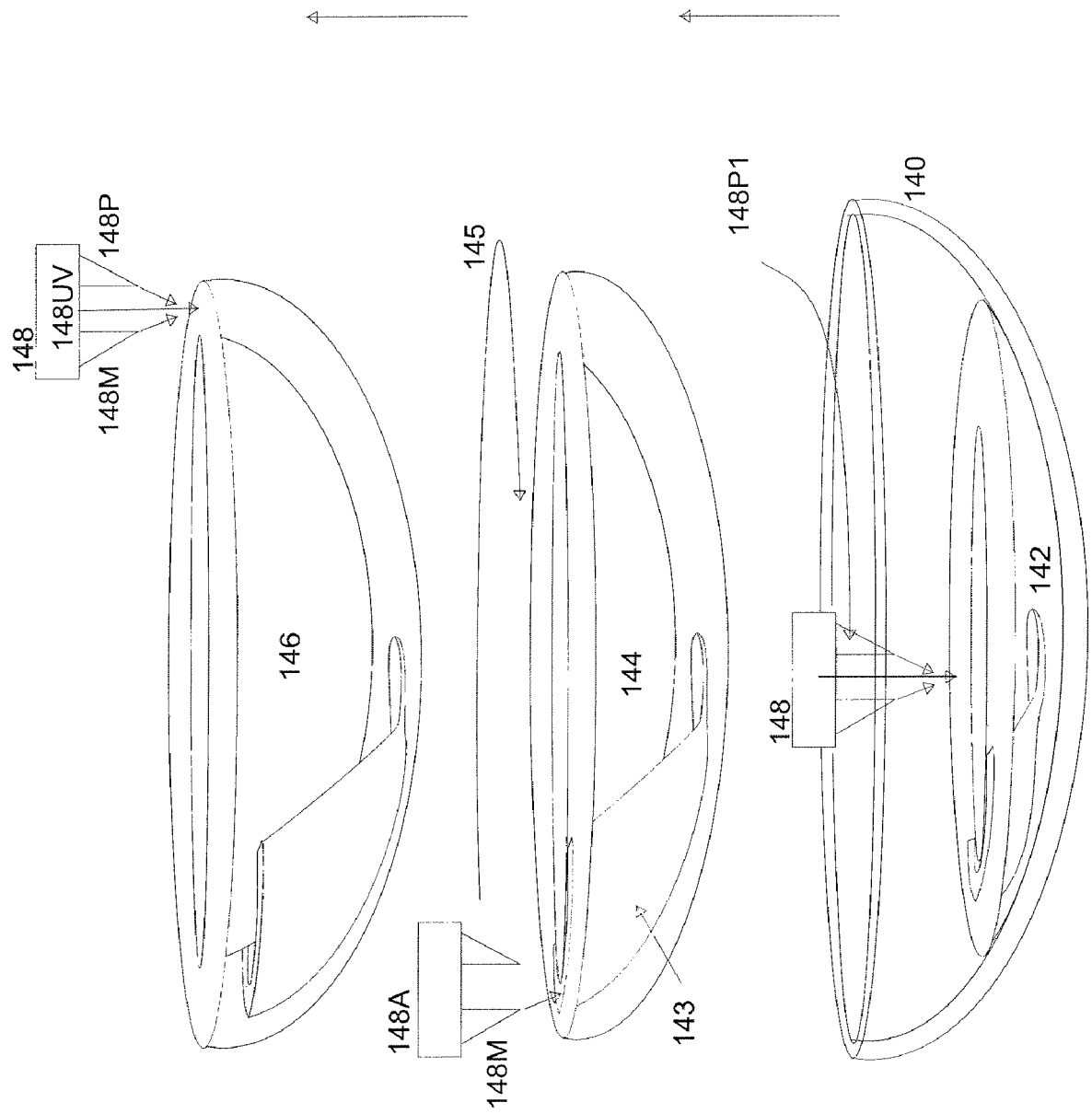
FIGS. 12-12A show, respectively a horizontal and vertical technique of 3D print polymerization to construct a contact lens containing hydrodynamic reservoir.

As depicted in FIG. 12, in order to create a contact lens in this manner it is necessary control the way in which the liquid monomer converts into a solid polymer. As mentioned above this process can be completed by heat, chemical or electromagnetic means. However, neither heat nor chemical methods lend themselves easily to the creation of fine detail during polymerization. On the other hand Ultra Violet (UV) light can easily be manipulated to act as a careful sculpting polymerization agent. The technique is similar to three-dimensional printing wherein a three-dimensional object is created by carefully fusing very thin layers on top on one another to build up a complete object.

In the present invention lens 146 is generated by depositing layers of monomer or polymer on a concave base with an inkjet head 148. Preferably the head 148 includes both a nozzle 148P from which the monomer is ejected and a UV source 148 UV. Advantageously, when the polymerization agent, from nozzle 148p of print head 148A, which is unfriendly to the eye, is discontinued, the polymerization process stops leaving liquid filled areas in the shape of the central reservoir, which in turn allows the raw monomer to be used as the hydrodynamic fluid because it will contain no ocular toxic polymerization agents. A very thin layer of unpolymerized fluid is left at the center of the lens corresponding to the area 19. In this manner, the lens is built up layer by layer to form an integral body.

In an alternate embodiment, as the print head 148 progresses around the lens, the monomer feed is discontinued where it covers the position of the reservoir and a different feed 148P1 is provided to the head 148P to fill the reservoir. In yet another embodiment, a second head is used to fill the reservoir with hydrodynamic agents like silicone oils.

The use of a UV transparent mold in combination with changing the UV beam diameter provides very accurate sculpting of the liquid monomer into a sold contact lens containing an internal reservoir filled with un-polymerized monomer acting as the hydrodynamic fluid. As seen in FIG. 12 the spray head 148 containing monomer nozzle 148M, polymerization agent nozzle 148P and an integrated UV light source 148UV is slowly spun around 145 inside mold 140 and the contact lens is slowly built up by successive passes 142, 144, 146 respectively. As the spray head reaches the area in, which reservoir 143 is to be constructed, nozzle 148P of nozzle head 148A discontinues spraying the polymerization agent. This stops the conversion of monomer to polymer. (Alternately both monomer and polymerization agent can be stopped and another spray head could be turned on to fill this area with fluid like silicone oil). In this way, over successive passes, with careful control of where and when the polymerization process takes place, the entire contact lens including the contoured walls of the intended reservoir within the center portion of the contact lens can be constructed while simultaneously "filling" the reservoir by means of just leaving the monomer in its unpolymerized, liquid state 143. Of courses, this process may also be used to make a standard contact lens, e.g. a lens without a reservoir.

Figure 12A:
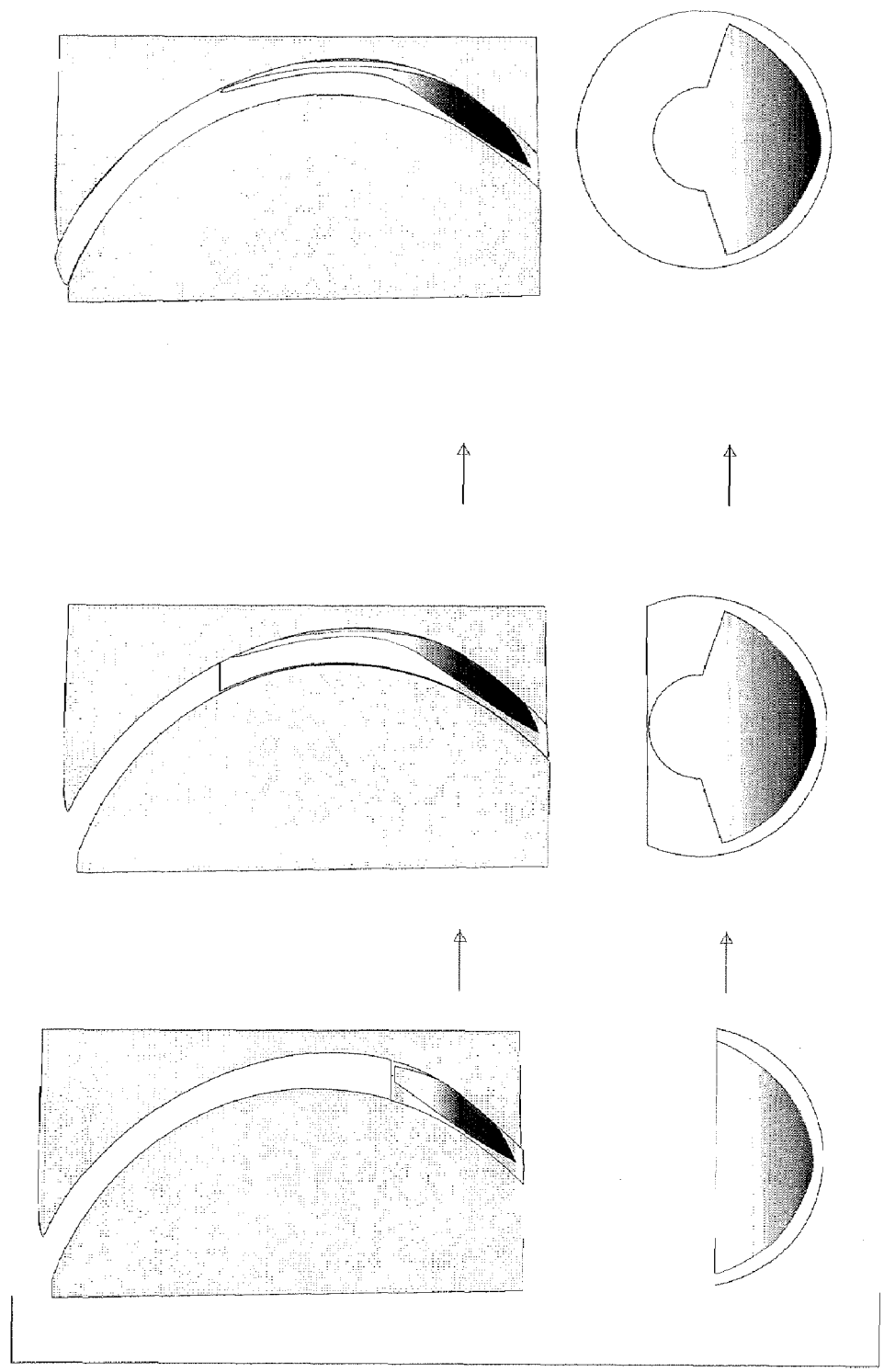

FIG. 12A depicts a similar process except the contact lens is constructed vertically from the bottom to the top instead of horizontally from the front convex surface to the back concave surface.

Another embodiment discloses a technique to produce to produce a reservoir within a contact lens after it has been partially or even fully polymerized. As described above this reservoir is for the purposes of redistribution of fluid or fluid pressure from a peripheral storage zone to a central optic zone for the purposes of mechanical, physical and optical alteration of the refractive nature of the contact lens.

Similar to the process explored for the use in corneal refractive surgery this process uses for example an eximer laser focused on the internal structure of an already polymerized contact lens. As seen in FIG. 13 the energy in beam 155 of laser 153 is focused inside a fully formed contact lens 150 to disrupt the molecular bonds of the polymer. As the beam is swept back and forth the contours of the intended internal fluid reservoir 154 are created. This etching process could be used to hollow out a complete reservoir inside a contact 158, or just portions like micro-channels or could be used to create the intended contours of the reservoir on the surface of two half, which would then be laminated together to create a finished reservoir. Once the reservoir has been created, fluid can be introduced through a surface port created by the laser similar to FIGS. 7B and 7C or through injection 7D. The filling port can then be sealed with polymerizing a drop of raw contact lens monomer.

The preceding sections provide some descriptions of several techniques for creating a hydrophilic contact lens which contains a fluid filled reservoir capable of redistribution of fluid or fluid pressure from a peripheral reservoir to a central optic zone for the purposes of mechanical, physical and optical alteration of the refractive nature of the contact lens. It is not meant to be an exhaustive or limiting only instructive on the general construction techniques to create a contact lens capable of undergoing refractive changes induced by hydrodynamic forces. Obviously, to anyone skilled in the art, numerous variations, combinations or other modifications can easily be envisioned or implemented to the invention without departing from its scope as defined in the appended claims.

I claim:

1. A method of making a contact lens comprising:
providing a first and a second shell, each shell having an inner and an outer surface, with at least one of said shells having an indentation on the inner surface;
providing a balloon;
laminating the shells together with the two inner surfaces facing each other with said balloon being inserted between the shells to form a reservoir within said indentation; and
filling said reservoir with a fluid.

2. The method of claim 1 wherein said shells and said fluid have similar optical characteristics.

3. The method of claim 1 further comprising making an opening in said reservoir and filling said reservoir through said opening.

4. The method of claim 1 wherein said shells are laminated using a polymer.

5. The method of claim 1 wherein first shell is constructed with its outer surface configured to rest on the eye of a person.

6. The method of claim 5 wherein said indentation is made in said first shell.

7. The method of claim 5 wherein said indentation is made in said second shell.

8. The method of claim 5 wherein each shell is made with a respective indentation.

9. A method of making a contact lens comprising:
providing a first shell and a second shell, each having an inner and an outer surface;
providing an intermediate shell having an opening;
providing a balloon in said opening;
laminating said first, said second shell and said intermediate shell together to form the contact lens, with the inner faces of the first and second shell contacting the intermediate shell and said balloon, wherein said balloon defines reservoir; and
filling said reservoir with a fluid.

10. The method of claim 9 wherein said fluid is introduced into the reservoir after the lamination.

11. A method of making a contact lens comprising:
providing a first shell and a second shell, each shell having an inner surface and an outer surface, at least one of said shells having an indentation on its inner surface;
providing a balloon filled with fluid; and
laminating said shells and said balloon together to form said contact lens, with said balloon being disposed in said indentation.

12. The method of claim 11 wherein said contact lens has a central region and a peripheral region, and said reservoir has an outer area disposed in said peripheral region and a central area in said central region, with substantially all the fluid being disposed in said outer area.

13. The method of claim 12 wherein said central area having two inner reservoir walls substantially touching each other.

* * * * *